United States Patent
Miller (10) Patent No.: US 9,581,770 B2
(45) Date of Patent: Feb. 28, 2017

(54) CENTERING FERRULE MOUNT FOR POLYMER WAVEGUIDE

(71) Applicant: Xyratex Technology Limited, Havant (GB)

(72) Inventor: Alistair Allen Miller, Emsworth (GB)

(73) Assignee: Xyratex Technology Limited, Havant (GB)

( * ) Notice: Subject to any disclaimer, the term of this patent is extended or adjusted under 35 U.S.C. 154(b) by 0 days.

(21) Appl. No.: 14/717,171

(22) Filed: May 20, 2015

(65) Prior Publication Data

US 2016/0341907 A1 Nov. 24, 2016

(51) Int. Cl.
G02B 6/36 (2006.01)
G02B 6/38 (2006.01)
G02B 6/122 (2006.01)

(52) U.S. Cl.
CPC ........... *G02B 6/3897* (2013.01); *G02B 6/122* (2013.01)

(58) Field of Classification Search
None
See application file for complete search history.

(56) References Cited

U.S. PATENT DOCUMENTS

| 4,863,232 A * | 9/1989 | Kwa | G02B 6/32 385/88 |
| 4,981,336 A * | 1/1991 | Mohan | G02B 6/3833 385/56 |
| 5,134,679 A | 7/1992 | Robin et al. | |
| 5,313,545 A * | 5/1994 | Kuo | B29C 45/16 385/129 |
| 5,325,451 A * | 6/1994 | Hartman | C03C 4/0014 385/132 |
| 5,359,687 A * | 10/1994 | McFarland | G02B 6/138 385/49 |
| 6,229,942 B1 * | 5/2001 | Engberg | G02B 6/3608 385/14 |
| 6,390,690 B1 * | 5/2002 | Meis | G02B 6/3897 385/147 |
| 6,801,693 B1 * | 10/2004 | Jacobowitz | G02B 6/2826 385/14 |
| 7,213,974 B2 | 5/2007 | Kiani et al. | |
| 8,770,855 B2 | 7/2014 | Miller | |
| 2003/0175000 A1 * | 9/2003 | Caracci | G02B 6/262 385/137 |
| 2003/0206680 A1 * | 11/2003 | Bakir | G01R 1/0491 385/14 |
| 2006/0120673 A1 * | 6/2006 | Morlion | G02B 6/30 385/89 |

FOREIGN PATENT DOCUMENTS

JP 10-186187 A * 7/1998

* cited by examiner

*Primary Examiner* — Mike Stahl
(74) *Attorney, Agent, or Firm* — Mueting, Raasch & Gebhardt, P.A.

(57) ABSTRACT

An apparatus includes a polymer waveguide element disposed on a circuit board and having a waveguide core between a first outer reference waveguide core and a second reference waveguide core having top and side exposed surfaces and defining opposing outer edges of the polymer waveguide element. A ferrule mount element optically couples the polymer waveguide element to an optical element through the circuit board. The ferrule mount includes two tapered features that mate with and form an interference fit with the exposed side surfaces of the first outer reference waveguide core and second outer reference waveguide core.

20 Claims, 5 Drawing Sheets

CENTERING FERRULE MOUNT FOR POLYMER WAVEGUIDE

The disclosure herein relates to a centering ferrule mount for a polymer waveguide to provide convenient and reliable optical connection to an optical element through an optical printed circuit board.

SUMMARY

The present disclosure relates to a centering ferrule mount for a polymer waveguide on an optical printed circuit board where the centering ferrule mount forms an interference fit with the polymer waveguide. The interference fit provides alignment of the centering ferrule mount and ensures a reliable optical connection to of an optical element to the polymer waveguide when the optical element is mated to the centering ferrule mount.

In at least one embodiment, an apparatus includes a polymer waveguide element disposed on a circuit board and having a waveguide core between a first outer reference waveguide core and a second reference waveguide core having top and side exposed surfaces and defining opposing outer edges of the polymer waveguide element. A ferrule mount element optically couples the polymer waveguide element to an optical element through the circuit board. The ferrule mount includes two tapered features that mate with and form an interference fit with the exposed side surfaces of the first outer reference waveguide core and second outer reference waveguide core.

In another embodiment, an apparatus includes a polymer element disposed on a circuit board and having a plurality of parallel extending cores between a first outer reference polymeric core and a second reference polymeric core. The first outer reference polymeric core and the second outer reference polymeric core have top and side exposed surfaces and define opposing outer edges of the polymer element. A ferrule mount element couples the polymer element to a circuit board element through an aperture in the circuit board. The ferrule mount includes two tapered features that align the ferrule mount to the polymer element and mate with and form an interference fit with the exposed side surfaces of the first outer reference core and second outer reference core.

In a further embodiment, a method includes providing a polymer waveguide element disposed on a circuit board and having a plurality of parallel extending waveguide cores between a first outer reference polymeric waveguide core and a second reference polymeric waveguide core. The first outer reference polymeric waveguide core and the second outer reference polymeric waveguide core have top and side exposed surfaces and define opposing outer edges of the polymer waveguide element. The method includes providing a ferrule mount element having two tapered features that define a waveguide element channel and decrease in width to a width that is less than a width of the polymer waveguide element. The polymer waveguide element is slid into the waveguide element channel of the ferrule mount element to an aligned position where the tapered features mate with and form an aligned interference fit with the exposed side surfaces of the first outer reference waveguide core and second outer reference waveguide core.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Polymer based optical waveguides provide numerous desirable properties for use in a multitude of electronic devices, including in some embodiments, data storage devices, network components, network appliances, routers, hubs and other similar devices. These waveguides can be formed on printed circuit boards (PCB) and be referred to optical PCBs. These waveguides and optical PCBs can function as a component or building block of a larger structure or apparatus. Alternatively the waveguides and optical PCBs can function without any other related devices or structures. The waveguides and optical PCBs can be integrated and connected to other structures and different components as well as in order to provide an assembly.

The present disclosure relates to a centering ferrule mount for a polymer element or waveguide on an optical printed circuit board where the centering ferrule mount forms an interference fit with the polymer waveguide. The interference fit provides alignment of the centering ferrule mount and ensures a reliable optical connection to of an optical element to the polymer waveguide when the optical element is mated to the centering ferrule mount. The disclosed centering ferrule mount provides a simple sliding engagement of the ferrule mount to the polymer waveguide to form an aligned optical connection node with an optical element engaged with the ferrule mount. This precise alignment is done without the need for extra alignment equipment. The centering ferrule mount forms an aligned interference fit with the exposed polymeric reference waveguide cores. Once in place, the ferrule mount is bonded to the printed circuit board with a quick curing U-V adhesive, for example.

Additional fixing screws can be optionally added through the holes in the circuit board for a more rugged or secure attachment. While the present disclosure is not so limited, an appreciation of various aspects of the disclosure will be gained through a discussion of the embodiments provided below.

It is to be understood that the waveguide configurations described herein are merely exemplary, and other waveguide configuration having additional or fewer waveguides in any similar (e.g., equivalent) arrangement are considered by the present disclosure. While the present disclosure is not so limited, an appreciation of various aspects of the disclosure will be gained through a discussion provided below.

Exemplary apparatus shall be described with reference to FIGS. 1 to 9B. It will be apparent to one skilled in the art that elements from one embodiment may be used in combination with elements of the other embodiments, and that the possible embodiments of such apparatus and/or device using combinations of features set forth herein is not limited to the specific embodiments shown in the figures and/or described herein. Further, it will be recognized that the size and shape of various elements herein may be modified but still fall within the scope of the present disclosure, although one or more shapes and/or sizes, or types of elements, may be advantageous over others.

Polymer waveguide technology can be utilized with electronic printed circuits and connected to opto-electronic devices to send and receive pulses (data) of light down the waveguides rather than send electrical pulses down copper tracks on the printed circuit board. The waveguide cores are created on top of a layer of cladding material. This bottom cladding is a clear material that has a lower index of refraction compared to the core material. It can be laid very accurately onto a stiff substrate or film to a desired thickness plus or minus tolerances. Once this layer is finished, a network of waveguide cores can then be created on top of that cladding layer. These waveguide cores can be normally be square in cross section (50×50 micrometers, for example) and follow whatever path is practical on the cladding layer. At same time, beside the two outer cores, two reference cores are created. These do not need to be very long as they are not used for data communications. These two reference cores are rectangular with widths larger than 50 micrometers, for example, but their height can be the same as the data waveguide cores. The cores are formed of polymeric material.

Once the waveguide cores are finished another layer of cladding is placed on top so as to fill in the gaps between and above (on top) of the data cores. This cladding will not cover the tops or outside edges of the reference cores however. They stay uncovered to serve as alignment surfaces. After the upper cladding layer is finished, the ends of the waveguides and the cutout in the substrate (printed circuit board, for example) are created by simply cutting through the cladding and core materials below, for example. This process will create end faces to be used to couple into devices or other optical items as well as create a very accurate cutout that is based on the edges of the reference waveguides.

The waveguide core dimensions can vary by as much +/−5%, which translates to +/−2.5 micrometer for 50 micrometer square waveguide cores, for example. The center to center positions of the individual waveguide cores can vary by about +/−1% so this can be considered negligible when it comes to coupling a typical 12 waveguide array with separations of 250 micrometers. For best coupling, the center axes of mating optical lenses, waveguides or fiber optics align and overlap with the center axis of each waveguide. Looking into the face of a waveguide core that means a virtual line protruding from and into the core length, located right in the middle of that surface. This is true for waveguide cores of any cross sectional dimension. And as noted previously, these center axes from one waveguide core to the next can be very accurately positioned making it easier to achieve an acceptable alignment of all of them in one operation. In practice, however, it is difficult to perfectly align multiple optical axes created on one single part with multiple axes of another part. The centering ferrule mount described below assists in alignment.

When the ferrule mount is pushed onto the front of the reference waveguide cores it causes the polymer reference cores to deform slightly. This is because the distance between tapered region expands to a little less than the width between the reference waveguide outer edges. The reference waveguides will deform quite easily (since they are polymeric material) and at the same rate and amount since they are the same size, they will both deform by the same amount if no additional side pressure is added. This deformation on each side of the waveguide array acts like a centering spring mechanism and thereby locates the ferrule mount into a middle travel position, which also corresponds to a good working alignment position to the working waveguide cores.

Figure 1:
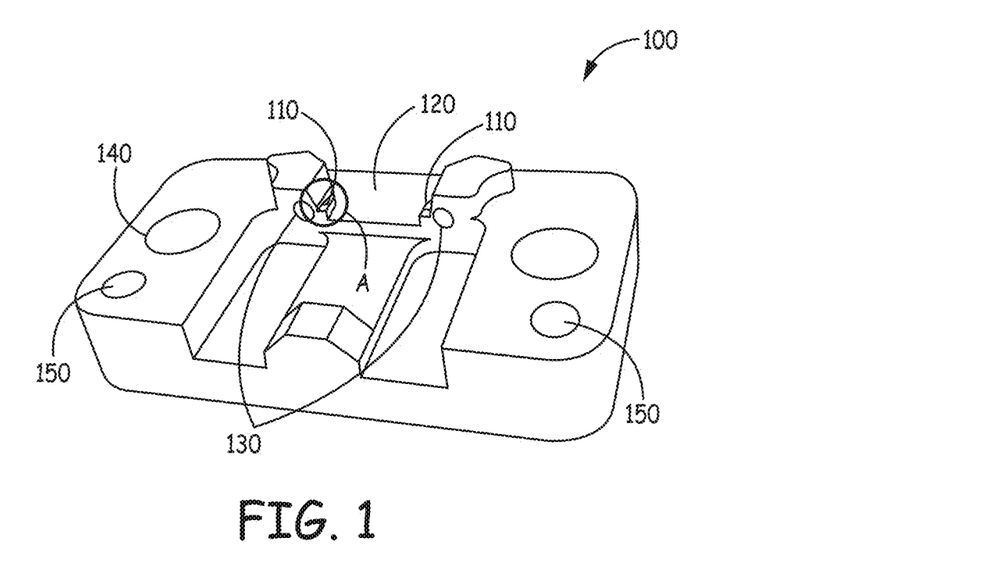
FIG. 1 is a schematic diagram perspective view of an illustrative centering ferrule mount.
Figure 2:
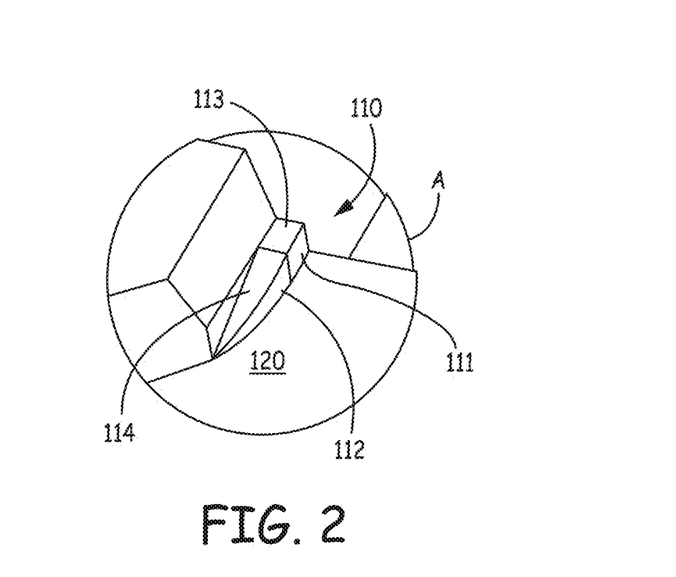
FIG. 2 is a schematic diagram perspective view of the tapered feature illustrated in area A of FIG. 1.

FIG. 1 is a schematic diagram perspective view of an illustrative centering ferrule mount 100. FIG. 2 is a schematic diagram perspective view of the tapered feature 110 illustrated in area A of FIG. 1. The centering ferrule mount 100 can have any useful configuration that optically couples the ferrule mount to any optical element, such as a lensed 90 degree prism, for example.

The centering ferrule mount 100 can include two tapered features 110 that define opposing sides of a waveguide element channel 120. Each of the two tapered features 110 have a tapered first surface 112 that is configured to contact and compress or deform the exposed side surface of the first or second outer reference polymeric waveguide core to form the interference fit (as described below). In many embodiments, the two tapered features 110 each have a tapered second surface 114 that is orthogonal to the tapered first surface 112. The tapered second surface 114 contacts the lower cladding layer (described below). The tapered first surface 112 can include a planar first surface portion 111 that is configured to contact and compress or deform the exposed side surface of the first or second outer reference polymeric waveguide core to form the interference fit (as described below). The tapered second surface 114 can include a planar first surface portion 113 that is configured to contact the lower cladding layer (described below).

The tapered features 110 can have a height and a width value independently in a range from 100 to 500 micrometers or from 200 to 400 micrometers. The tapered features 110 can have a length value in a range from 1 mm to 2 mm. Each tapered feature 110 can include a planar or flat portion 111, 113 at the narrow end of the waveguide element channel 120. This planar or flat portion 111, 113 can have a length of about 0.5 mm.

The waveguide element channel 120 decreases in width to a width that is less than a width of the polymer waveguide it is engaged with (as described below). The two tapered features 110 define this decrease in width. In many embodiments the waveguide element channel 120 smoothly decreases in width. The two tapered features 110 cooperate to contact and compress or deform the exposed side surface of the first or second outer reference polymeric waveguide core to form an aligned interference fit (as described below).

In many embodiments, the ferrule mount element 100 includes one or more alignment elements that mate with an alignment feature of an associated optical element to optically couple the optical element to the waveguide core (described below). Two alignment apertures 130 are illustrated adjacent to the waveguide element channel 120. These alignment apertures 130 can mate with alignment protrusions of an associated optical element to optically couple the optical element to the waveguide core (described below).

The centering ferrule mount 100 can optionally include fixation holes 140. The fixation holes 140 can receive a fixation element to optionally fix the ferrule mount 100 to a substrate or another optical element. The centering ferrule mount 100 can optionally include raised rest surfaces 150. The raised rest surfaces 150 can contact the associated substrate such as a circuit board or bottom cladding layer. The raised rest surfaces 150 can also set the thickness of adhesive material (such as a U.V. curable adhesive, for example) that adheres the centering ferrule mount 100 to the circuit board. The raised rest surfaces 150 can have any useful thickness such as 0.1 mm for example.

Figure 3:
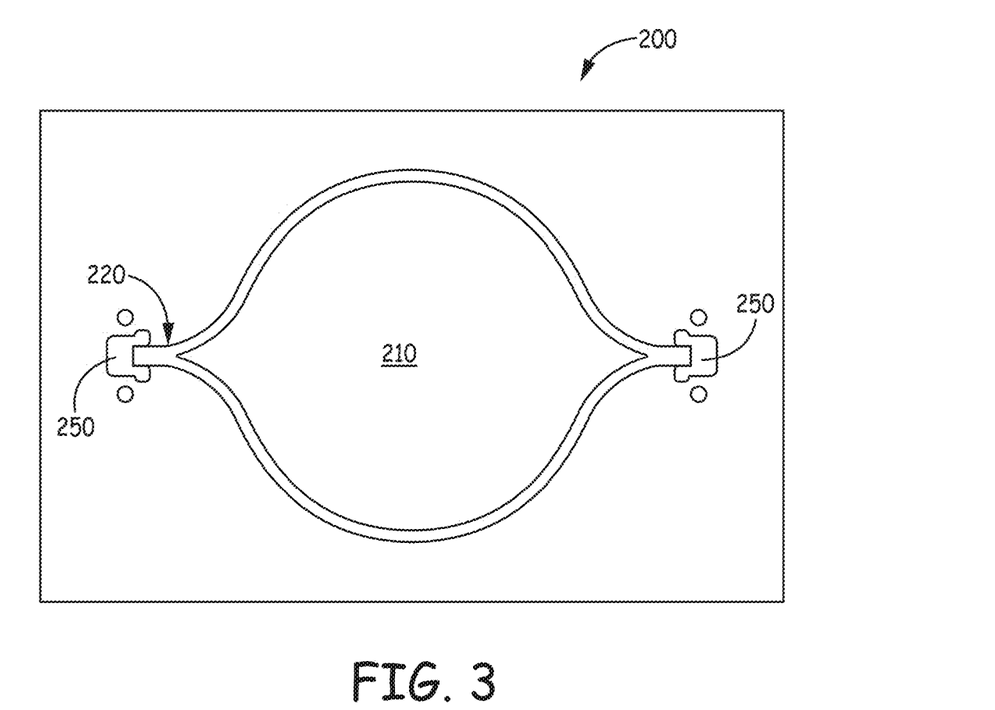
FIG. 3 is a schematic diagram top view of an illustrative polymer element or waveguide on a circuit board.
Figure 4:
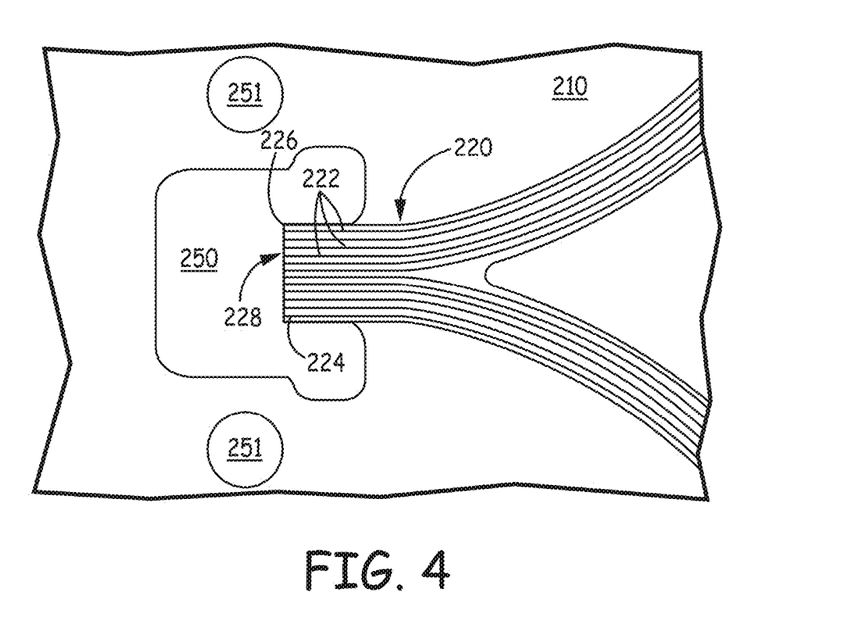
FIG. 4 is a schematic diagram top view close up view of the illustrative polymer element or waveguide of FIG. 3 terminating in a cut-out of the circuit board.
Figure 5:
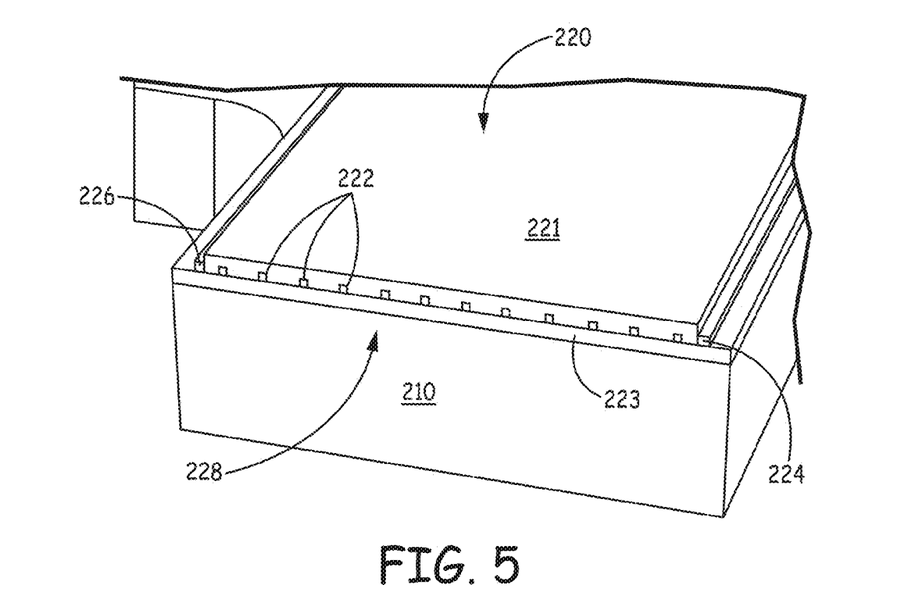
FIG. 5 is a schematic diagram perspective view of the terminating end of the illustrative polymer element or waveguide.

FIG. 3 is a schematic diagram top view of an illustrative optical circuit board 200 that includes a polymer element 220 on a circuit board 210. FIG. 4 is a schematic diagram top view close up view of the illustrative polymer element 220 of FIG. 3 terminating in a cut-out 250 of the circuit board 210. FIG. 5 is a schematic diagram perspective view the terminating end 228 of the illustrative polymer element 220.

In many embodiments the polymer element 220 is a polymeric or polymer waveguide that transmits light along a length of the waveguide. The polymer waveguide element 220 is disposed on a circuit board 210 and has one or more waveguide cores 222 between a first outer reference waveguide core 224 and a second reference waveguide core 226. In many embodiments, the polymer waveguide element 220 includes a plurality of waveguide cores 222 such as at least 6 or at least 10. The first outer reference waveguide core 224 and second reference waveguide core 226 have top and side exposed surfaces defining opposing outer edges of the polymer waveguide element 220.

The polymer waveguide element 220 can include an upper cladding layer 221. The polymer waveguide element 220 can include a lower cladding layer 223. In many embodiments, the one or more waveguide cores 222 can be sandwiched between the upper cladding layer 221 and the lower cladding layer 223. The first outer reference waveguide core 224 and second reference waveguide core 226 can be disposed on the lower cladding layer 223. The first outer reference waveguide core 224 and second reference waveguide core 226 can be exterior to the upper cladding layer 221, as illustrated.

The optical circuit board 200 can optionally include fixation holes 251 that extend through the circuit board 210. The fixation holes 251 can receive a fixation element to fix the ferrule mount 100 to the circuit board 210 or another optical element.

The terminating end 228 polymer waveguide 220 can extend into a cut-out 250 of the circuit board 210. The cut-out 250 is configured to receive the centering ferrule mount 100 and optically coupled optical element, if present. The terminating end 228 polymer waveguide 220 can form a cantilever into the cut-out 250.

The one or more waveguide cores 222 and first outer reference waveguide core 224 and second reference waveguide core 226 can have any useful dimensions. In many embodiments the one or more waveguide cores 222 have a height in a range from 25 to 200 micrometers or from 25 to 75 micrometers and a width in a range from 25 to 200 micrometers or from 25 to 75 micrometers. The first outer reference waveguide core and second outer reference waveguide core can each have a height in a range from 25 to 200 micrometers or from 25 to 100 micrometers and a width in a range from 25 to 250 micrometers or from 50 to 150 micrometers.

The ferrule mount element optically couples the polymer waveguide element to an optical element through the circuit board. The ferrule mount includes two tapered features that mate with and form an interference fit with the exposed side surfaces of the first outer reference waveguide core and second outer reference waveguide core. In many embodiments, the ferrule mount element optically couples the polymer waveguide element to an optical element through an aperture in the circuit board. The ferrule mount includes two tapered features that align the ferrule mount to the polymer waveguide element and mate with and form an interference fit with the exposed side surfaces of the first outer reference waveguide core and second outer reference waveguide core.

Figure 6:
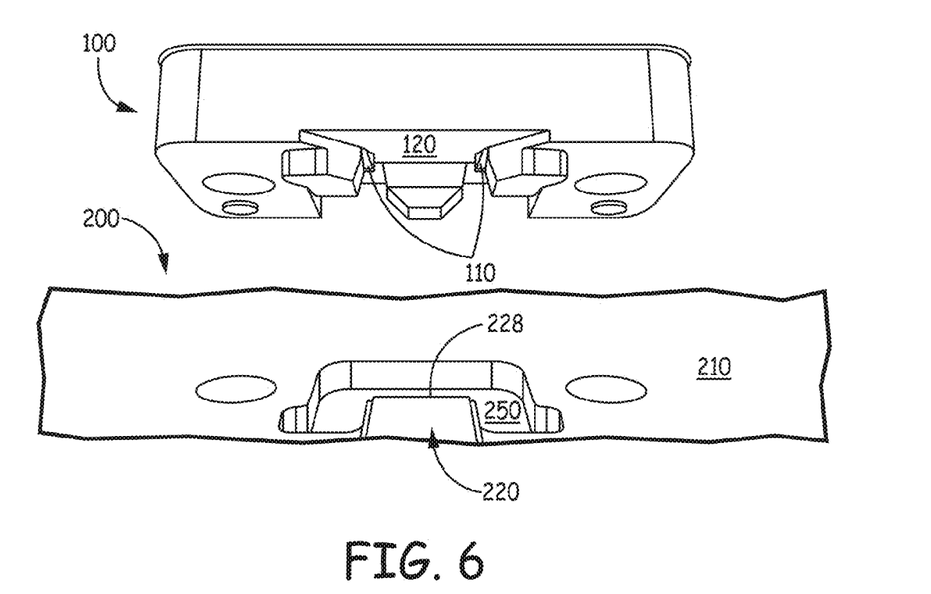
FIG. 6 is a schematic diagram perspective view of the illustrative centering ferrule mount in position to be inserted into the cut-out and slid onto the terminating end of the illustrative polymer waveguide.
Figure 7A:
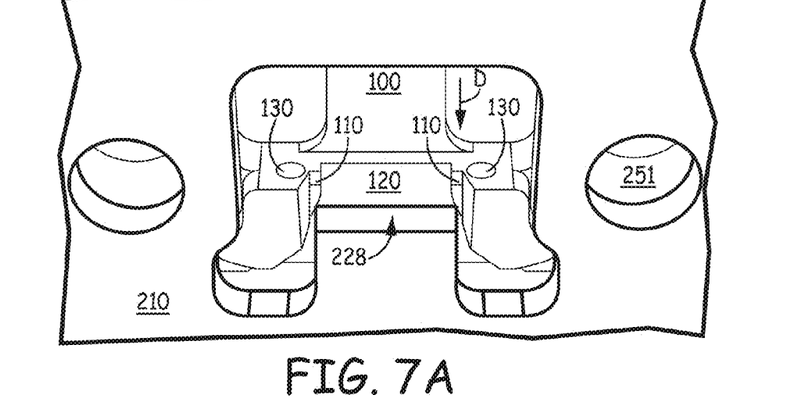
FIGS. 7A-7C are schematic diagram perspective views of the illustrative centering ferrule mount being inserted onto the terminating end of the illustrative polymer waveguide.
Figure 7B:
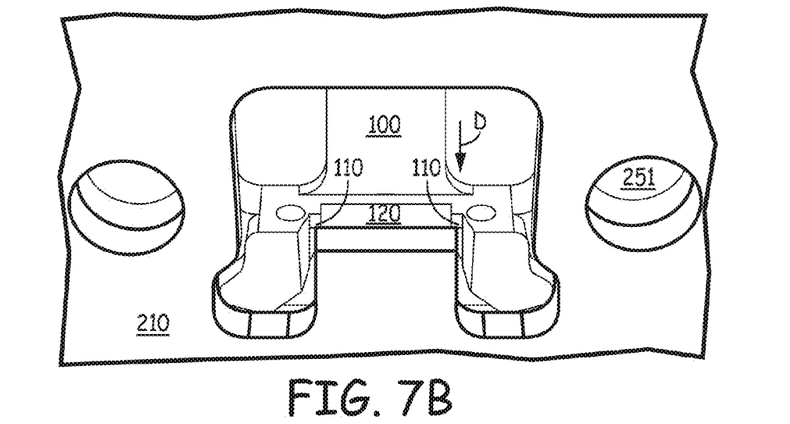
Figure 7C:
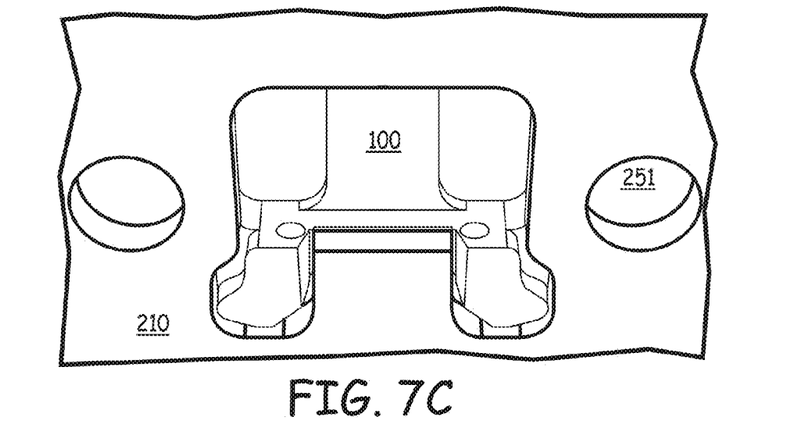
Figure 8:
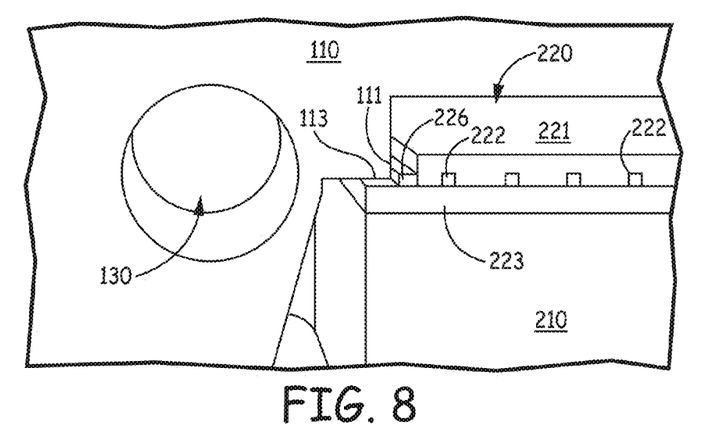
FIG. 8 is a schematic diagram perspective view of the aligned position of the centering ferrule mount with the polymer waveguide.

FIG. 6 is a schematic diagram perspective view of the illustrative centering ferrule mount 100 in position to be inserted into the cut-out 250 and slid onto the terminating end 228 of the illustrative polymer waveguide 220. The terminating end 228 enters the waveguide element channel 120 and contacts the tapered features 110 to center and align the polymer waveguide 220 with the ferrule mount 100. FIGS. 7A-7C are schematic diagram perspective views of the illustrative centering ferrule mount 100 being inserted onto the terminating end 228 of the illustrative polymer waveguide 220. FIG. 8 is a schematic diagram perspective view of the aligned position of the centering ferrule mount 100 with the polymer waveguide 220.

FIG. 7A and FIG. 7B illustrate the ferrule mount 100 waveguide element channel 120 engaging the terminating end 228 polymer waveguide 220 and sliding in a direction or arrow D. The two tapered features 110 cooperate to contact and compress or deform the exposed side surface of the first and second outer reference polymeric waveguide cores 224, 226 (see FIG. 5) to form an aligned interference fit as the ferrule mount 100 is moved into the final aligned position. FIG. 7C illustrates the ferrule mount 100 in the final aligned position with the terminating end 228 of the illustrative polymer waveguide 220.

FIG. 8 is a schematic diagram perspective close-up view of one side of the aligned centering ferrule mount 100 coupled to the polymer waveguide 220. As described above, the polymer waveguide element 220 can include an upper cladding layer 221 and a lower cladding layer 223 with one or more waveguide cores 222 sandwiched between the upper cladding layer 221 and the lower cladding layer 223. The reference waveguide core 226 (second one illustrated here) can be disposed on the lower cladding layer 223 but outside of the upper cladding layer 221.

As described above, the tapered feature 110 can include a planar first surface portion 111 that is configured to contact and compress or deform the exposed side surface of the outer reference polymeric waveguide core 226 to form the interference fit. In addition, the tapered feature 110 can include a planar second surface portion 113 that is configured to contact the lower cladding layer 223. The tapered features 110 cooperate to reduce a width of the waveguide element channel 120 to a value that is just less than a width of the polymer waveguide 220 so that the first and second outer reference polymeric waveguide cores 224, 226 are compressed and/or deformed to form an aligned interference fit between the ferrule mount 100 and the polymer waveguide 220.

Figure 9A:
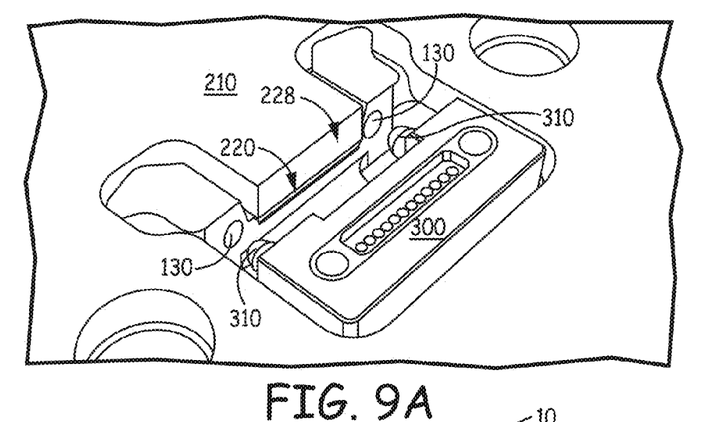
FIGS. 9A-9B are schematic diagram perspective views of an illustrative optical element.
Figure 9B:
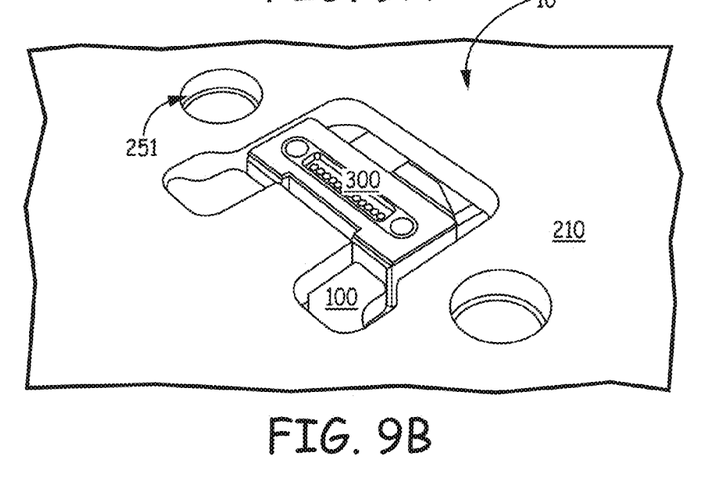

FIGS. 9A-9B are schematic diagram perspective views of an illustrative optical element 300 being optically coupled to the polymer waveguide 220 via the ferrule mount 100.

Once the ferrule mount element 100 is fixed to the circuit board and polymer waveguide 220, an optical element 300 can be optically coupled to the polymer waveguide 220. The ferrule mount element 100 can include one or more alignment elements 130 that mate with an alignment feature 310 of an associated optical element 300 to optically couple the optical element 300 to the waveguide core 222. Two alignment apertures 130 are illustrated adjacent to the waveguide element channel 120. These alignment apertures 130 can mate with alignment protrusions 310 of the optical element 300 to align and optically couple the optical element 300 to the polymer waveguide 220. An optically coupled article 10 results from this arrangement.

The described ferrule mount provides a simple design to allow it to slide onto the ends of the reference waveguide cores and be optically aligned for reliable light coupling. The ferrule mount utilizes two tapered elements on each side of a polymer waveguide channel that engage with the surfaces of the two outer reference waveguide cores and the bottom cladding layer of the polymer waveguide.

In the preceding description, reference is made to the accompanying set of drawings that form a part hereof and in which are shown by way of illustration several specific embodiments. It is to be understood that other embodiments are contemplated and may be made without departing from (e.g., still falling within) the scope or spirit of the present disclosure. The preceding detailed description, therefore, is not to be taken in a limiting sense. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

It is noted that terms such as "top", "bottom", "above, "below", etc. may be used in this disclosure. These terms should not be construed as limiting the position or orientation of a structure, but should be used as providing spatial relationship between the structures.

Embodiments of the apparatus including the centering ferrule mount that forms an interference fit with a polymer waveguide are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:

1. An apparatus comprising:
   a polymer waveguide element disposed on a circuit board and having a waveguide core between a first outer reference waveguide core and a second outer reference waveguide core, the first outer reference waveguide core and the second outer reference waveguide core have top and side exposed surfaces and define opposing outer edges of the polymer waveguide element; and
   a ferrule mount element optically coupling the polymer waveguide element to an optical element through the circuit board, the ferrule mount element comprising two tapered features that mate with and form an interference fit with the exposed side surfaces of the first outer reference waveguide core and second outer reference waveguide core.

2. The apparatus of claim 1, wherein the polymer waveguide element comprises a plurality of parallel extending waveguide cores between the first outer reference waveguide core and the second outer reference waveguide core.

3. The apparatus of claim 1, wherein the two tapered features contact and compress or deform the exposed side surfaces of the first outer reference waveguide core and second outer reference waveguide core to form the interference fit.

4. The apparatus of claim 1, wherein the polymer waveguide element comprises an upper cladding layer disposed on the waveguide core.

5. The apparatus of claim 1, wherein the first outer reference waveguide core and second outer reference waveguide core each have a height in a range from 25 to 100 micrometers and a width in a range from 25 to 150 micrometers.

6. The apparatus of claim 1, wherein the two tapered features define a waveguide element channel that decreases in width.

7. The apparatus of claim 1, wherein the two tapered features define a waveguide element channel that smoothly decreases in width.

8. The apparatus of claim 1, wherein the two tapered features define a waveguide element channel that decreases in width to a width that is less than a width of the polymer waveguide element.

9. The apparatus of claim 1, wherein the ferrule mount element is fixed to the circuit board.

10. The apparatus of claim 1, wherein the ferrule mount element comprises alignment elements that mate with an alignment feature of an optical element that optically couples to the waveguide core.

11. An apparatus comprising:
    a polymer element disposed on a circuit board and having a plurality of parallel extending cores between a first outer reference polymeric core and a second outer reference polymeric core where the first outer reference polymeric core and the second outer reference polymeric core have top and side exposed surfaces and define opposing outer edges of the polymer element; and
    a ferrule mount element coupling the polymer element to a circuit element through an aperture in the circuit board, the ferrule mount element comprising two tapered features that align the ferrule mount element to the polymer element and mate with and form an interference fit with the exposed side surfaces of the first outer reference polymeric core and second outer reference polymeric core.

12. The apparatus of claim 11, wherein the polymer element is a polymer waveguide element and comprises a lower cladding layer separating the circuit board from the plurality of parallel extending cores and separating the circuit board from the first outer reference polymeric core and the second outer reference polymeric core, the two tapered features contacting the lower cladding layer, and the first outer reference polymeric core is a first outer reference polymeric waveguide core and the second outer reference polymeric core is a second outer reference polymeric waveguide core.

13. The apparatus of claim 12, wherein the two tapered features each have a tapered first surface that contacts and compresses or deforms the exposed side surfaces of the first outer reference polymeric waveguide core and second outer reference polymeric waveguide core to form the interference fit.

14. The apparatus of claim 13, wherein the two tapered features each have a tapered second surface that is orthogonal to the tapered first surface, the tapered second surface contacts the lower cladding layer.

15. The apparatus of claim 11, wherein the two tapered features define a waveguide element channel that decreases in width to a width that is less than a width of the polymer element.

16. The apparatus of claim 11, wherein the ferrule mount element is fixed to the circuit board.

17. The apparatus of claim 16, wherein the ferrule mount element comprises alignment elements that mate with an alignment feature of an optical element that optically couples to the plurality of parallel extending cores and the optical element is fixed to the ferrule mount element.

18. A method comprising:
providing a polymer waveguide element disposed on a circuit board and having a plurality of parallel extending waveguide cores between a first outer reference polymeric waveguide core and a second outer reference polymeric waveguide core, the first outer reference polymeric waveguide core and the second outer reference polymeric waveguide core have top and side exposed surfaces and define opposing outer edges of the polymer waveguide element;
providing a ferrule mount element having two tapered features that define a waveguide element channel and decrease in width to a width that is less than a width of the polymer waveguide element;
sliding the polymer waveguide element into the waveguide element channel of the ferrule mount element to an aligned position where the two tapered features mate with and form an aligned interference fit with the exposed side surfaces of the first outer reference polymeric waveguide core and second outer reference polymeric waveguide core.

19. The method of claim 18, wherein the sliding step comprises compressing the exposed side surfaces of the first outer reference polymeric waveguide core and second outer reference polymeric waveguide core to form the aligned interference fit.

20. The method of claim 18, further comprising mating alignment features of the ferrule mount element with an alignment feature of an optical element to optically couple the optical element to the polymer waveguide element.

* * * * *